United States Patent

Kennedy, III et al.

[11] Patent Number: 5,983,108
[45] Date of Patent: Nov. 9, 1999

[54] METHOD AND APPARATUS FOR A NATION-WIDE CELLULAR TELEPHONE NETWORK

[75] Inventors: William C. Kennedy, III, Dallas; Kenneth R. Westerlage, Fort Worth, both of Tex.

[73] Assignee: HighwayMaster Communications, Inc., Dallas, Tex.

[21] Appl. No.: 08/433,633

[22] Filed: May 2, 1995

Related U.S. Application Data

[60] Division of application No. 08/095,166, Jul. 20, 1993, abandoned, which is a continuation-in-part of application No. 07/826,521, Jan. 27, 1992, abandoned.

[51] Int. Cl.$^6$ .................................................. H04Q 7/38
[52] U.S. Cl. ........................ 455/456; 455/432; 455/435
[58] Field of Search .................................. 379/58, 59, 60, 379/63; 455/33.1, 33.2, 54.1, 56.1, 414, 422, 432, 435, 445, 456, 457, 433

[56] References Cited

U.S. PATENT DOCUMENTS

| | | | |
|---|---|---|---|
| Re. 34,034 | 8/1992 | O'Sullivan | 379/59 |
| 3,518,674 | 6/1970 | Moorehead et al. | 343/112 |
| 3,680,121 | 7/1972 | Anderson et al. | 343/112 TC |

(List continued on next page.)

FOREIGN PATENT DOCUMENTS

| | | | |
|---|---|---|---|
| B3767589 | 4/1993 | Australia | G01S 5/02 |
| 0242099 | 10/1987 | European Pat. Off. | G01S 5/14 |
| 0290725 | 11/1988 | European Pat. Off. | H04Q 7/04 |

(List continued on next page.)

OTHER PUBLICATIONS

"EIA/TIA Interim Standard—Cellular Radiotelecommunications Intersystem Operations: Automatic Roaming," EIA/TIA/IS–41.3–B, *Electronic Industries Association Engineering Department*, Jan, 1992, 58 pages and table of contents.

"EIA/TIA Interim Standard—Cellular Radiotelecommunications Intersystem Operations: Operations, Administration, and Maintenance," EIA/TIA/IS–41.4–B, *Electronics Industries Association Engineering Department*, Jan., 1992, 29 pages and table of contents.

(List continued on next page.)

*Primary Examiner*—Dwayne D. Bost
*Assistant Examiner*—William G. Trost
*Attorney, Agent, or Firm*—Baker & Botts, L.L.P.

[57] ABSTRACT

A method and apparatus for a nation-wide cellular telephone network that controls access to cellular systems is provided in which a cellular system (14) includes a mobile unit (16), transmission towers (18), MTSO (20), and a clearinghouse link (22). The cellular system (14) is linked to a telecommunications platform (24). The telecommunications platform (24) is linked to central hosts (26 and 28). Calls to or from mobile unit (16) are directed through telecommunications platform (24), thereby reducing opportunities for cellular fraud and reducing cellular air usage charges.

73 Claims, 5 Drawing Sheets

U.S. PATENT DOCUMENTS

| | | | |
|---|---|---|---|
| 3,714,650 | 1/1973 | Fuller et al. | 343/6.5 LC |
| 3,757,290 | 9/1973 | Ross et al. | 340/23 |
| 3,789,409 | 1/1974 | Easton | 343/112 R |
| 3,848,254 | 11/1974 | Drebinger et al. | 343/112 R |
| 4,053,893 | 10/1977 | Boyer | 343/112 PT |
| 4,083,003 | 4/1978 | Haemming | 325/6 |
| 4,107,689 | 8/1978 | Jellinek | 343/112 TC |
| 4,152,693 | 5/1979 | Ashworth, Jr. | 340/24 |
| 4,177,466 | 12/1979 | Reagan | 343/112 TC |
| 4,222,052 | 9/1980 | Dunn | 343/112 R |
| 4,266,098 | 5/1981 | Novak | 379/142 X |
| 4,428,052 | 1/1984 | Robinson et al. | 364/436 |
| 4,428,057 | 1/1984 | Setliff et al. | 364/521 |
| 4,435,711 | 3/1984 | Ho et al. | 343/389 |
| 4,445,118 | 4/1984 | Taylor et al. | 343/357 |
| 4,547,778 | 10/1985 | Hinkle et al. | 343/456 |
| 4,590,569 | 5/1986 | Rogoff et al. | 364/452.06 |
| 4,651,157 | 3/1987 | Gray et al. | 342/457 |
| 4,660,037 | 4/1987 | Nakamura | 340/990 |
| 4,688,244 | 8/1987 | Hannon et al. | 379/58 |
| 4,700,374 | 10/1987 | Bini | 379/60 |
| 4,734,928 | 3/1988 | Weiner et al. | 379/59 |
| 4,740,792 | 4/1988 | Sagey et al. | 342/457 |
| 4,742,357 | 5/1988 | Rackley | 342/457 |
| 4,750,197 | 6/1988 | Denekamp et al. | 379/58 |
| 4,754,465 | 6/1988 | Trimble | 375/1 |
| 4,776,003 | 10/1988 | Harris | 379/91 |
| 4,791,572 | 12/1988 | Green, III et al. | 364/449 |
| 4,809,005 | 2/1989 | Counselman, III | 342/352 |
| 4,833,477 | 5/1989 | Tendler | 342/389 |
| 4,833,701 | 5/1989 | Comroe et al. | 379/60 |
| 4,833,702 | 5/1989 | Shitara et al. | 379/60 |
| 4,860,341 | 8/1989 | D'Avello et al. | 379/91 |
| 4,866,762 | 9/1989 | Pintar | 379/200 |
| 4,876,738 | 10/1989 | Selby | 379/59 X |
| 4,891,650 | 1/1990 | Sheffer | 342/457 |
| 4,891,761 | 1/1990 | Gray et al. | 364/452 |
| 4,897,642 | 1/1990 | DiLullo et al. | 340/825.06 |
| 4,901,340 | 2/1990 | Parker et al. | 379/60 |
| 4,907,290 | 3/1990 | Crompton | 455/56 |
| 4,908,629 | 3/1990 | Apsell et al. | 342/457 |
| 4,912,756 | 3/1990 | Hop | 379/60 |
| 4,953,198 | 8/1990 | Daly et al. | 379/61 |
| 5,003,317 | 3/1991 | Gray et al. | 342/457 |
| 5,014,206 | 5/1991 | Scribner et al. | 364/449 |
| 5,025,253 | 6/1991 | DiLullo et al. | 340/825.06 |
| 5,032,845 | 7/1991 | Velasco | 342/457 |
| 5,043,736 | 8/1991 | Darnell et al. | 342/357 |
| 5,045,861 | 9/1991 | Duffett-Smith | 342/457 |
| 5,046,082 | 9/1991 | Zicker et al. | 379/59 |
| 5,055,851 | 10/1991 | Sheffer | 342/457 |
| 5,068,656 | 11/1991 | Sutherland | 340/989 |
| 5,090,050 | 2/1992 | Heffernan | 379/60 |
| 5,101,500 | 3/1992 | Marui | 455/33 |
| 5,119,102 | 6/1992 | Barnard | 342/357 |
| 5,121,126 | 6/1992 | Clagett | 342/419 |
| 5,131,019 | 7/1992 | Sheffer et al. | 379/39 |
| 5,142,281 | 8/1992 | Park | 340/991 |
| 5,142,654 | 8/1992 | Sonberg et al. | 379/59 |
| 5,155,689 | 10/1992 | Wortham | 64/460 |
| 5,159,625 | 10/1992 | Zicker | 379/59 |
| 5,166,694 | 11/1992 | Russell et al. | 342/457 |
| 5,208,756 | 5/1993 | Song | 364/449 |
| 5,223,844 | 6/1993 | Mansell et al. | 342/357 |
| 5,225,842 | 7/1993 | Brown et al. | 342/357 |
| 5,237,612 | 8/1993 | Raith | 380/23 |
| 5,247,564 | 9/1993 | Zicker | 379/40 |
| 5,335,278 | 8/1994 | Matchett et al. | 455/33.1 X |
| 5,392,458 | 2/1995 | Sasuta et al. | 455/54.1 |
| 5,396,540 | 3/1995 | Gooch | 379/59 |
| 5,513,111 | 4/1996 | Wortham | 455/456 X |

FOREIGN PATENT DOCUMENTS

| | | | |
|---|---|---|---|
| 0367935 | 5/1990 | European Pat. Off. | H04Q 7/04 |
| 3516357 | 11/1986 | Germany | H01Q 7/04 |
| 3932029 | 6/1990 | Germany | G01S 1/00 |
| 2193861 | 2/1988 | United Kingdom | H04Q 7/04 |
| 2221113 | 1/1993 | United Kingdom | G01S 5/00 |
| 8904035 | 5/1989 | WIPO | G10L 5/06 |
| WO8904035 | 5/1989 | WIPO | G10L 5/06 |
| 8912835 | 12/1989 | WIPO | G01S 5/02 |

OTHER PUBLICATIONS

"EIA/TIA/ Interim Standard—Cellular Radiotelecommunications Intersystem Operations: Data Communications," EIA/TIA/IS–41.5–B, *Electronic Industries Association Engineering Department*, Jan., 1992, 84 pages and table of contents.

"EIA/TIA Interim Standard—Cellular Radiotelecommunications Intersystem Operations: Functional Overview," EIA/TIA/IS–41.1–B, *Electronic Industries Association Engineering Department*, Jan., 1992, 14 pages and table of contents.

"EIA/TIA Interim Standard—Cellular Radiotelecommunications Intersystem Operations: Intersystem Handoff," EIA/TIA/IS–41.2–B, *Electronic Industries Association Engineering Department*, Jan., 1992, 25 pages and table of content.

"EIA/TIA Interim Standard—Cellular Radio–Telecommunications Intersystem Operations: Automatic Roaming," EIA/TIA/IS–41.3–B, *Electronic Industries Association Engineering Department*, Dec., 1991, 64 pages and table of contents.

"Trimpack Technical Specifications," *TrimbleNavigation*, May, 1989.

James C. Reynolds, et al. "GPS–Based Vessel Position Monitoring and Dislay System," *IEEE Plans '90 Position Location and Navigation Symposium*, Aug., 1990, pp. 601–607.

R. DeSadaba, "Personal Communications in the Intelligent Network," *British Telecommunications Engineering*, vol. 9, Aug., 1990, pp. 80–83.

METHOD AND APPARATUS FOR A NATION-WIDE CELLULAR TELEPHONE NETWORK

RELATED APPLICATIONS

This application is a divisional application of U.S. application Ser. No. 08/095,166, filed Jul. 20, 1993 and entitled "Method and Apparatus for a Nation-Wide Cellular Telephone Network," now abandoned, which is a continuation-in-part of U.S. application Ser. No. 07/826,521, filed Jan. 27, 1992, and entitled "Phantom Mobile Identification Number Method and Apparatus," now abandoned, which is incorporated herein by reference.

This application is related to U.S. application Ser. No. 08/150,238, filed Nov. 9, 1993, and entitled "Phantom Mobile Identification Number Method and Apparatus", U.S. Pat. No. 5,454,027, which is a continuation of U.S. application Ser. No. 07/826,521, filed Jan. 27, 1992, entitled "Phantom Mobile Identification Number Method and Apparatus, now abandoned.

TECHNICAL FIELD OF THE INVENTION this invention relates generally to the field of telecommunications, and more particularly to a method and apparatus for a nation-wide cellular telephone network.

BACKGROUND OF THE INVENTION

The proliferation-of cellular telephone systems has made them a convenient choice for nation-wide communications. However, cellular air time is relatively expensive, and there is, therefore, a need to control the amount of time that nation-wide systems use cellular telephone networks. For example, a nation-wide trucking system requires centralized information on the current status of the fleet of trucks. Although such information can be sent through cellular telephone systems to a central location, the cost of using such cellular networks is prohibitive absent some way of controlling access to and information sent across the cellular network.

Another problem is that of roaming cellular phones. With present systems, a "roamer" must manually register its location each time it enters a new cellular system. This registration is then forwarded to the roamer's home system. This manual registration is inconvenient and is consequently often overlooked, resulting in missed calls. Moreover, calls placed to roamers must be routed through the home system, and are often expensive.

Furthermore, the fragmentation of cellular service providers results in disintegrated monitoring and control, often contributing to fraudulent use of the cellular telephone networks. The increasing fraud adds significantly to the cost of cellular air time, especially for nation-wide users of the cellular network.

Therefore, a need has arisen for a method and apparatus for controlling access to cellular telephone networks in an integrated nation-wide system. A need has also arisen for a call delivery system that reduces costs, inconvenience, and missed calls.

SUMMARY OF THE INVENTION

In accordance with the teachings of the present invention, a method and apparatus for a nation-wide cellular telephone network in which access to cellular telephone systems is controlled is provided which substantially eliminates or reduces disadvantages and problems associated with prior art cellular telephone systems.

In particular, a method of controlling access to cellular telephone systems is provided in which a cellular telephone call is initiated from a mobile unit. The call is directed to a telecommunications platform, and a handshake protocol is performed with the mobile unit. The call is connected only if the handshake protocol is properly performed. Similarly, a method of controlling access to cellular telephone systems is provided in which calls to a mobile unit are initiated from a calling party. A handshake protocol is performed between the mobile unit and the calling party, and the call is connected only if the handshake protocol is property performed.

In accordance with the invention, an apparatus is also disclosed for controlling access to cellular telephone systems. In particular, a mobile unit is operable to send and receive cellular telephone calls, and the mobile unit includes circuitry for performing a handshake protocol with any party calling or called by the mobile unit. A telecommunications platform is coupled to at least one cellular telephone system and is operable to send calls to and receive calls from the mobile unit. The telecommunications platform also includes circuitry for performing the handshake protocol with a mobile unit, such that calls to or from the mobile unit are completed only if the handshake protocol is properly performed. The switches within each of the cellular telephone systems are operable to direct calls from the mobile unit to the telecommunications platform.

Also disclosed is an apparatus for controlling access to cellular telephone systems, in which a plurality of cellular units are each operable to send a present message upon entering a new cellular telephone system or upon some other event. A telecommunications platform receives the present messages, and sends at least part of the present message to any one of a number of central hosts. Furthermore, the present message may contain location information, thereby allowing for call delivery based on the location information.

An important technical advantage of the present invention is the fact that calls to or from mobile units are directed through a telecommunications platform, thereby allowing for multiple levels of fraud protection. In particular, a handshake protocol is required when any call is directed to or received from one of the mobile units, thereby preventing theft of cellular air time.

Another important advantage of the present invention is the fact that present messages can be automatically sent by mobile units upon entering into new cellular systems, without the need for dialing a cellular phone call, thereby saving cellular air usage charges and cellular air time.

Still another advantage of the present invention is that the location of roaming phones can be maintained at a central location, thereby allowing for efficient call delivery.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
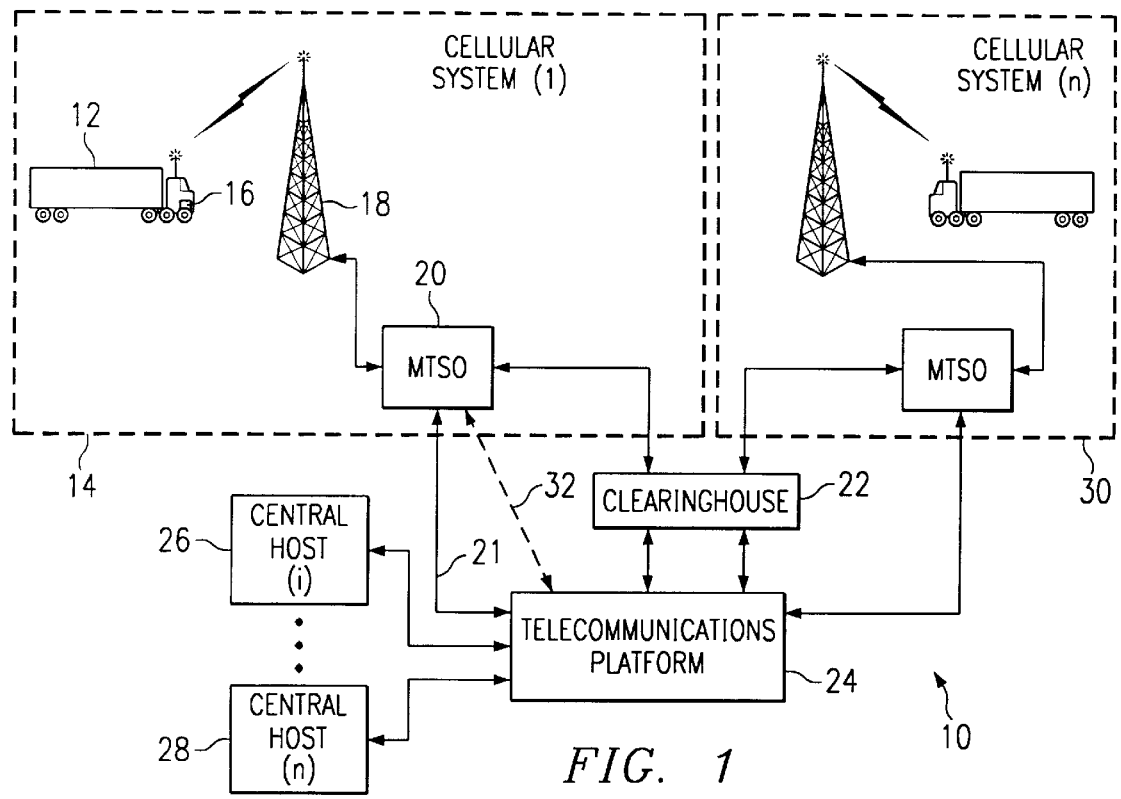
FIG. 1 illustrates a block diagram of a nation-wide cellular system constructed according to the teachings of the present invention.

FIG. 1 is a block diagram of a nation-wide cellular network 10 constructed according to the teachings of the present invention. As shown in FIG. 1, a vehicle 12 is within cellular system 14. Vehicle 12 includes a mobile unit 16, which will be discussed in detail below. Cellular system 14 includes transmission towers 18 (only one tower is shown for clarity, it being understood that each cellular system includes a plurality of transmission towers). Cellular system 14 also includes a central mobile telecommunications switching office (MTSO) 20 coupled to the transmission tower 18.

MTSO 20 switches calls to and from the cellular system 14 and the land based telecommunications system. MTSO 20 is also coupled to clearinghouse 22. The link between MTSO 20 and clearinghouse 22 is a data link, and clearinghouse 22 provides call validation information to MTSO 20. For example, MTSO 20 can be configured to connect calls only if clearinghouse 22 provides validation information on the call, such as that the cellular phone involved has good credit, or is authorized to make calls. Clearinghouse 22 may also maintain other information, such as information on "roaming" phones' present locations, and home systems. In existing cellular systems, companies such as GTE/TSI, EDS, and McCaw provide the clearinghouse function.

MTSO 20 is also coupled to telecommunications platform ("platform") 24 through a telecommunications link 21 allowing both voice and data transmissions. Clearinghouse 22 is also coupled to platform 24. In turn, platform 24 is coupled to central hosts 26 and 28. Central hosts 26 and 28 are shown for clarity. It should be understood that many other central hosts may be similarly coupled to platform 24. Furthermore, other cellular systems will also be coupled to telecommunications platform 24. For clarity, FIG. 1 illustrates one other such cellular system, cellular system 30. As shown, cellular system 30 also includes transmission towers and an MTSO.

Dashed line 32 indicates a link between MTSO 20 and platform 24. With a proposed standard (IS41, revision A), validation of calls can be performed prior to the placing of cellular calls. For example, at power up, or upon first entry into a particular cellular system, a cellular phone can issue its identification numbers, and pre-validation can be performed. Alternatively, the MTSO 20 can poll mobile unit 16 to request identification for validation and registration. The pre-validation may be between MTSO 20 and a clearinghouse, such as clearinghouse 22. Likewise, platform 24 may perform the pre-validation without resort to an outside clearinghouse, over link 32. With pre-call validation performed by clearinghouse 22, later data transmissions, such as feature requests, can be sent directly to platform 24 over link 32. It should be understood that link 32 may be the same as link 21.

In operation, nation-wide cellular network 10 operates to control access to and information sent across cellular systems such as cellular systems 14 and 30. In particular, all calls to or from mobile unit 16 must pass through telecommunications platform 24. Therefore, calls to and from mobile unit 16 are controlled to limit access to and time on cellular system 14. The details of this control will be discussed below.

Figure 2:
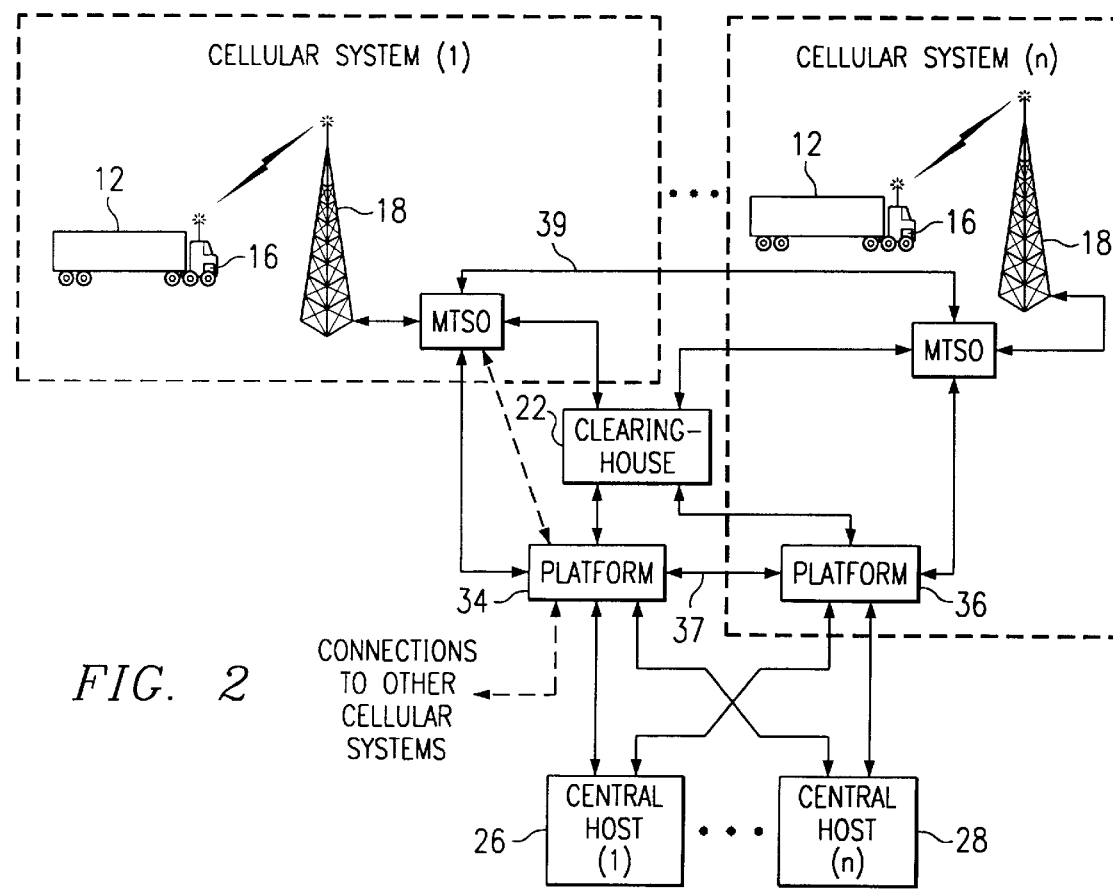
FIG. 2 illustrates another embodiment of a nation-wide cellular system constructed according to the teachings of the present invention.

FIG. 2 illustrates an alternate embodiment of the present invention which includes distributed telecommunications platforms. FIG. 2 includes the elements described above in connection with FIG. 1, with the exception that the telecommunications platform is distributed. Illustrated in FIG. 2 are platforms 34 and 36. In contrast to platform 24 of FIG. 1, which is centrally located and to which all cellular systems are connected, platforms 34 and 36 may be distributed throughout the nation-wide cellular network. As shown in FIG. 2, platform 34 may be coupled to one or more cellular systems. For example, platform 34 may be coupled to all of the east coast cellular systems. Likewise, platform 36 is a distributed platform, and is associated with and part of a particular cellular system.

Also shown in FIG. 2 is a communications link 37 from platform 34 to platform 36 that allows the distributed platforms to exchange voice and data, which may include user activity, systems operation, and billing functions. In particular, the distributed platforms 34 and 36 can exchange information regarding user validation and fraud management. The distributed platform embodiment also provides fault tolerant and traffic management features to the nation-wide cellular telephone system, not unlike those features found in conventional long-distance telephone systems. Thus, as is shown in FIGS. 1 and 2, telecommunications platforms may be centrally located or distributed, as required by the needs of the particular system implementing the present invention.

Also illustrated in FIG. 2 is link 39. Link 39 allows for data transfer between MTSOs of various cellular systems. Such a link may be an SS7 backbone link for linking cellular systems. Link 39 allows cellular systems to share information such as validation, roaming information, billing, and call routing, among other types of information. For example, one cellular system that knows the location of a particular cellular phone, such as mobile unit 16, may share that information with other cellular systems. Platform 24, across link 32, may tie into link 39. This allows platform 24 to have access to all MTSO 20s of different cellular systems.

Figure 3:
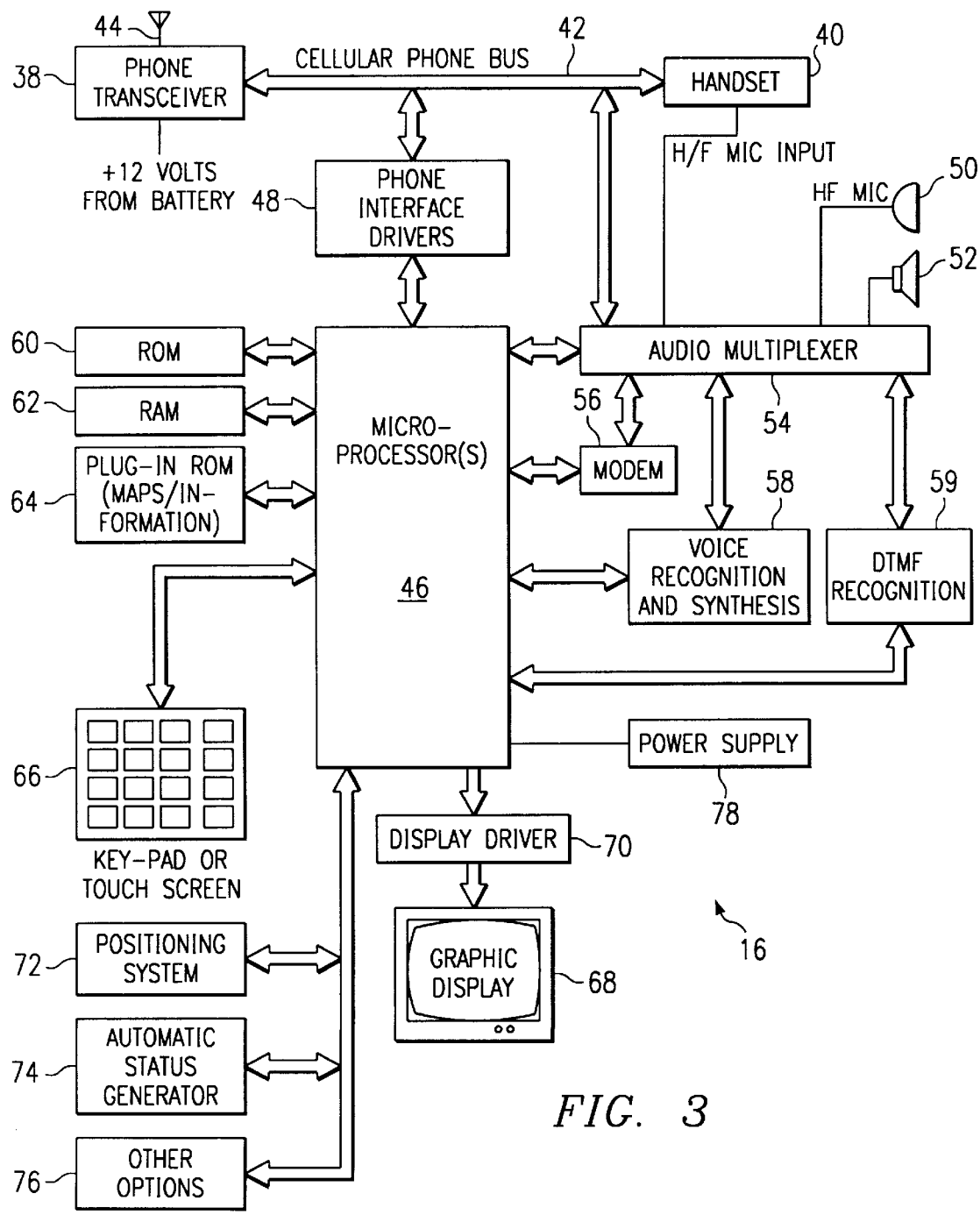
FIG. 3 illustrates a mobile unit constructed according to the teachings of the present invention.

FIG. 3 illustrates a mobile unit 16 constructed according to the teachings of the present invention. As shown in FIG. 3, phone transceiver 38 and hand set 40 are coupled to cellular phone bus 42. Phone transceiver 38 receives and transmits signals across antenna 44, including cellular transmission and reception of voice, data, and DTMF data, among other signals. The cellular phone bus 42 is coupled to processor 46 through phone interface drivers 48. Phone interface drivers 48 provide the necessary protocol for communications between the processor 46 and the phone transceiver 38 and hand set 40.

A hands-free microphone 50 and speaker 52 are provided for hands-free communications by the operator of the mobile unit. The hands-free microphone 50 and speaker 52 are coupled to audio multiplexer 54. Audio multiplexer 54 is also coupled to the hand set 40, the cellular phone bus 42, and the processor 46. The audio multiplexer 54 is also coupled to a modem 56 and a voice recognition and synthesis system 58. The modem 56 allows for digital communication between the processor 46 and the cellular system, as received from and transmitted through antenna 44 and phone transceiver 38. Modem 56, or any suitable device, is used to distinguish between voice and data and handle the information accordingly. Voice recognition and synthesis system 58 allows for voice activation of various functions of the mobile unit. Voice recognition and synthesis system 58 is coupled to processor 46.

Processor 46 and audio multiplexer 54 are also coupled to a dual-tone multi-frequency ("DTMF") recognizer 59, which allows for recognition of DTMF data. All data transmissions to or from mobile unit 16 can be made using DTMF.

Mobile unit 16 also allows for reception and storing of telephone numbers. These numbers may be received as modem or DTMF data, and may be recalled and automatically dialed. Co-pending U.S. patent application Ser. No. 07/826,520, Method and Apparatus for Storing. Telephone Data," filed Jan. 27, 1992, and assigned to By-Word Technologies, Inc. of Dallas, Tex., discloses these functions in detail, and is herein incorporated by reference. Furthermore, processor 46 of mobile unit 16 can execute software allowing for voice mail functions for calls to mobile unit 16.

Processor 46 is also coupled to a read-only memory 60 and a random access memory 62. These memories are for storage of instructions and data for operation of processor 46. Furthermore, a plug-in ROM module 64 may also be coupled to processor 46 for optional information, such as map and emergency assistance information for a particular locality.

A key pad 66 is provided for user input of various information into the mobile unit 16 through processor 46. It should be understood that key pad 66 could comprise many other input devices, such as a touch screen. Information is displayed at mobile unit 16 through graphic display 68, which is driven by processor 46 through display driver 70.

Mobile unit 16 allows for input of location information from a LORAN-C system, a global positioning satellite (GPS) system or any suitable system providing location information of the mobile unit. This input is shown by positioning system 72 in FIG. 3. The positioning system 72 may be located within the housing of the mobile unit 16, or part or all of positioning system 72 may be located outside the mobile unit 16. The data sent to the mobile unit 16 from positioning system 72 can be either raw location data (for example, data directly received from a LORAN-C system) or processed location data. Therefore, the processing of raw location data can occur within the positioning system 72 itself, within processor 46, or transmitted through phone transceiver 38 and antenna 44 for later processing at the platform 24 or central host 26 of FIG. 1.

Mobile unit 16 also allows for input of status information through automatic status generator 74. The automatic status generator 74 comprises any sensors, controllers, and processors used to monitor performance parameters of the vehicle 12, and operates to pass information from such monitors to the mobile unit 16. As will be discussed, status information may be received by the mobile unit 16 from either the automatic status generator 74 or the key pad 66. Block 76 allows for the input or output of various other options, such as an alarm input which, for example, could indicate that a vehicle on which the mobile unit is located has been broken into. As other examples, block 76 allows for the input or output of fax data or digital data to or from a modem. Such inputs and outputs may be from personal computers, for example, from users of recreational vehicles or traveling salesmen. Throughout this discussion, data communications, including handshaking, will be discussed in connection with modem transfers for clarity, it being understood that such transmissions can be made as DTMF data. A power supply 78 powers the mobile unit 16.

In operation, mobile unit 16 operates to transmit and receive information, including voice and data, across a cellular system and through telecommunications platform 24 of FIG. 1. Ultimately, data transmitted from mobile unit 16 is sent through platform 24 to one of the central hosts, for example central hosts 26 or 28 shown in FIG. 1.

Mobile unit 16, through control of processor 46, receives all calls through telecommunications platform 24, and makes all outgoing calls through telecommunications platform 24. This restriction is accomplished through use of a handshake protocol. The details of this protocol will be discussed below in connection with calls to or from the mobile unit. The ability to require that all calls to and from the mobile unit pass through the platform 24 is an important advantage of the present invention, and allows for control of the character and length of calls made to and from the mobile unit. This is important in reducing cellular telephone usage costs, for example for a nation-wide trucking company, in which the trucking company provides mobile units in each of the trucks of the fleet, and wishes to restrict the character and length of calls from and to the mobile units.

The mobile unit 16 allows for transmission and reception of both voice and data. The voice transmissions, once a call is connected, are performed conventionally. Hands-free microphone 50 and speaker 52 allow for hands-free voice communications.

Data received by remote unit 16 is input to the processor 46 through modem 56. Data transmitted from mobile unit 16 is transmitted under control of the processor 46 through modem 56. Data to be transmitted from mobile unit 16 may be input in several ways. Key pad 66 may be used by a user of the mobile unit 16 to input various data, such as location data or status data (for example, whether a vehicle is broken down, whether it is loading, unloaded, waiting to load, waiting to unload, etc.). Such data may also be input by voice command through voice recognition and synthesis system 58. Data may also be automatically generated for output by mobile unit 16. For example, positioning system 72, which may comprise a LORAN-C positioning system, a GPS system, or any other positioning system, may generate position location information for transmission by mobile unit 16.

As discussed above, positioning system 72 may generate longitude and latitude information, or simply raw data, for example from a GPS system, to be transmitted from mobile unit 16. If only raw data is generated by a positioning system 72, then processor 46, the platform 24, or the central host 26 can generate the longitude and latitude information for positioning information. Likewise, automatic status generator 74 may be used to automatically generate status information, such as engine performance, trailer temperature (for example, if a refrigerated trailer tractor is associated with the remote unit), or other status information.

Processor 46 drives graphic display 68 through display driver 70 to display data received by mobile unit 16 for viewing by a user of mobile unit 16. Such data, for example, may be messages from a central host on weather conditions, delivery or destination instructions, among other messages. Furthermore, plug-in ROM 64 provides various information, such as map information or emergency assistance information for use by a user of the remote unit 16. This information can be displayed on graphic display 68.

Figure 4:
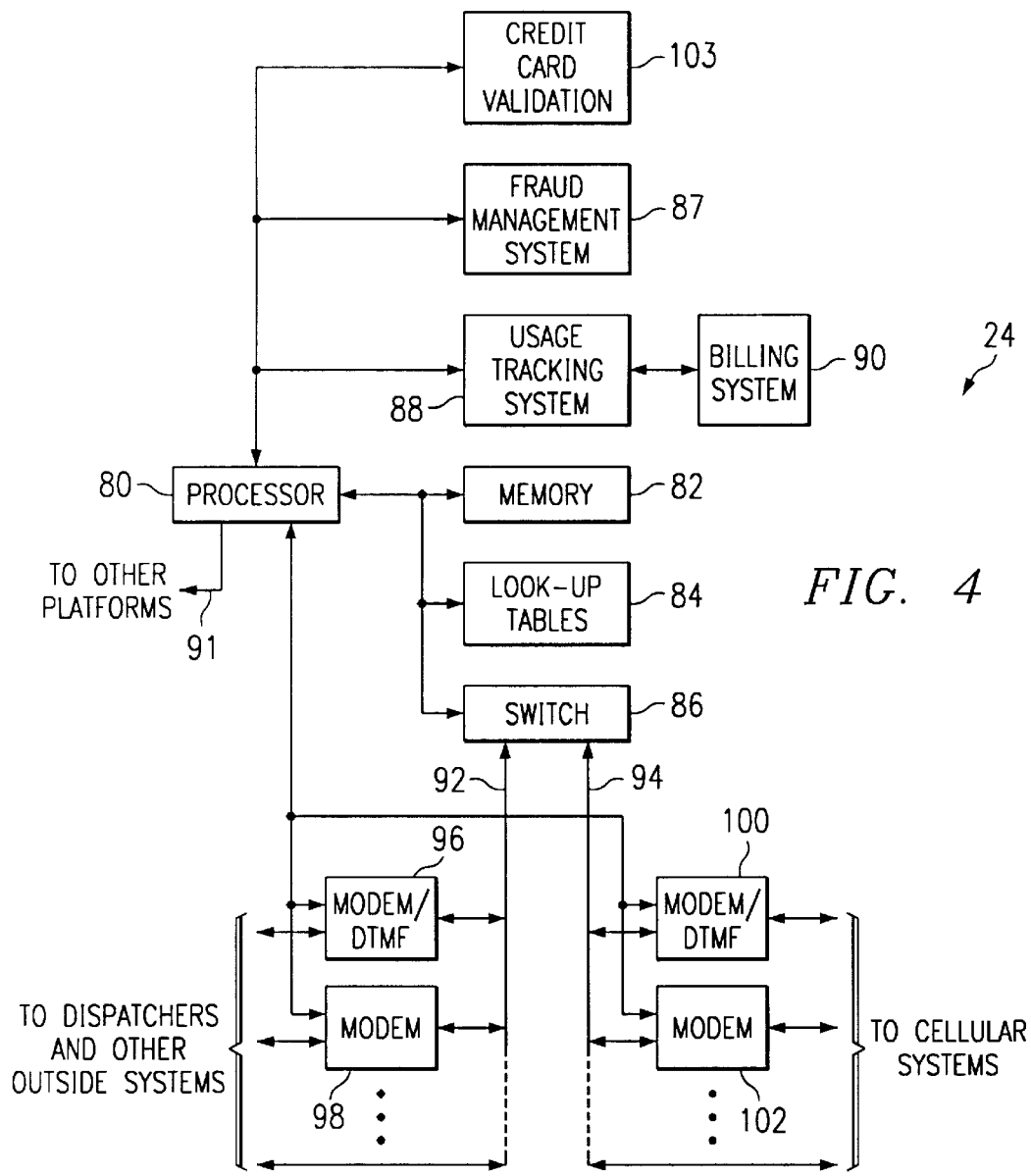
FIG. 4 illustrates a telecommunications platform constructed according to the teachings of the present invention.

FIG. 4 illustrates a block diagram of telecommunications platform 24 constructed according to the teachings of the present invention. A processor 80 is coupled to memory 82, look-up tables 84, and switch 86. Processor 80 is also coupled to fraud management system 87, usage tracking system 88 and billing system 90. In the distributed platform embodiment of FIG. 2, processor 80 may also communicate with another platform through communications link 91. Switch 86 is coupled to telecommunications trunks 92 and 94. Trunk 92 allows for telecommunications connections to central hosts, such as central hosts 26 and 28 of FIG. 1, as well as other outside land based systems. As shown in FIG. 4, some of the individual telecommunications lines of trunk 92 are coupled to modems, such as modems 96 and 98, thus allowing for data communications. Likewise, trunk 94 allows for telecommunications connections with various cellular systems, such as cellular systems 14 and 30 of FIG. 1. Some of the individual telecommunications lines are coupled through modems, such as modems 100 and 102, so as to allow for data communications with the cellular systems. Modems 96 and 100 are illustrated as MODEM/DTMF, to indicate that DTMF data can be transmitted and received as well. Modems 96, 98, 100 and 102 are coupled to processor 80 and can also operate to allow both voice and data communications. Trunks 92 and 94 are separated for clarity to show one bank of telecommunications lines serving dispatchers and other outside systems while another bank serves cellular systems. However, switch 86 can contain a single trunk or several trunks to accomplish the operations of the platform.

Telecommunications platform 24 operates as a smart telecommunications switch. Calls to and from remote unit 16 are passed through switch 86. Processor 80 monitors switch 86 and records information on each call through switch 86. This information, such as the number and length of calls to each remote unit 16, is recorded in usage tracking system 88. In this manner, bills can be generated for usage of telecommunications platform 24. Typically there will be several remote units associated with a particular nation-wide system, such as a trucking system. Thus, all calls to and from remote units owned by that trucking system will be logged for billing to that particular trucking system.

As discussed previously, a fraud management system 87 performs a handshake protocol between the telecommunications platform 24 and the remote unit 16. This protocol ensures that only authorized calls are made to and from mobile unit 16. If the handshake protocol is not performed correctly, then processor 80 will disconnect the call through switch 86, thereby greatly reducing costs resulting from unauthorized usage of cellular networks. Processor 80 also links to credit card validation system 103, to validate credit cards for allowing for personal calls, as will be discussed.

Figure 5:
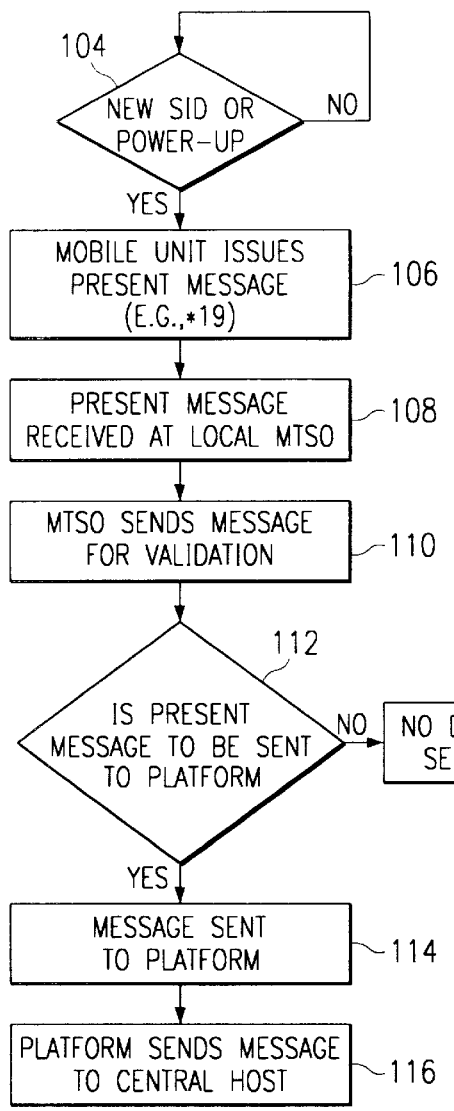
FIG. 5 is a flog diagram for transmission and reception of an present message according to the teachings of the present invention.

FIG. 5 is a flow diagram for transmission and reception of a "present" message according to the teachings of the present invention. Mobile unit 16 of the present invention, upon entry into a new cellular system, issues a present message which will eventually be sent to its central host. The "present" message can also be generated in response to a poll from platform 24 or MTSO 20, periodically, upon power up of mobile unit 16, upon re-establishment of communication, through use of a feature request reserved for the "present" message, or during pre-call or post-call validation, among other events. This "present" message can also be sent automatically or manually, and provides information to the central host on the current cellular system in which the mobile unit is located. Furthermore, other information, such as status information, can be sent with this "present" message. An important technical advantage of the present invention is the fact that this "present" message may be sent automatically, and with a minimum of cellular air time, thus providing significant cost savings. The "present" message may be sent to platform 24 through clearinghouse 22, through link 21 (for example, as part of a call), or through link 32 of FIG. 1.

Turning to the flow diagram of FIG. 5, at decision block 104, mobile unit 16 monitors the system identification number of the particular cellular system in which it is located. This system identification number, as is generally known in the art, is periodically issued by the cellular system in the overhead message stream. Once the remote unit 16 identifies a new system identification number, indicating that the mobile unit has entered a new system, it issues an "present" message at block 106. For example, the "present" message can be initiated by transmitting a "*19" feature request. Presently, "*19" is used in mobile systems to clear the roaming status of a cellular phone. As discussed above, the "present" message can also be generated upon other events, such as power up of the mobile unit 16.

Every cellular phone has associated with it a mobile identification number ("MIN") and an electronic serial number ("ESN"). These numbers are transmitted by the cellular phone whenever it makes a call or issues a feature request, such as "*19." Certain digits of the ESN are used by local cellular carriers. The unused digits may be used by mobile unit 16 to send information, such as location or status data. For example, longitude and latitude data can be embedded in the unused portion of the ESN. Likewise, certain digits of the MIN may not be necessary to identify calls to be directed to platform 24, and thus data may be embedded in these unused digits. Thus, the "present" message may contain important data as well. At block 108, the "present" message is received at MTSO 20 of FIG. 1. The MTSO 20 typically appends the cellular system identification number plus a switch identification number to the MIN and ESN numbers. As discussed, the "present" message may also be sent as part of a call from the mobile unit 16, and thus is sent to platform 24 across link 21.

When the "*19" is received at the clearinghouse 22 at block 110, it will determine whether the "present" message is to be sent to the telecommunications platform 24 at block 112. If the "present" message is not to be sent to the platform, then no data is sent. The clearinghouse 22 determines whether the "present" message is to be sent to the platform 24 by matching the MIN/ESN of the mobile unit to numbers stored in a pre-established user data base. This data base is established by making arrangements with the clearinghouse 22 that all communications from particular cellular phones, i.e., the mobile units 16, will be recognized by their MIN/ESN and directed to the platform 24. This data base can also be established such that even with a mobile unit registered at some home cellular system, the "present" message will be directed to the platform 24.

As discussed above, a direct link 32 may exist between MTSO 20 and platform 24. This link 32 allows for direct transmission of data and feature requests, such as the "*19" feature request and "present" data message, to the platform 24. MTSO 20 can be configured to directly send such transmissions by pre-arranging with MTSO 20 to recognize particular mobile units 16, or by forwarding such instructions from clearinghouse 22 as part of a pre-call validation scheme.

One embodiment allows the clearinghouse 22 to identify the mobile units 16 by a specified area code and prefix of the MIN. Upon matching the registered mobile units 16 with the user data base in the clearinghouse 22, the "present" message is sent to the platform 24 at block 114. The platform then timestamps and stores all "present" messages received from mobile unit 16 through the local carrier. The platform stores the data under each MIN/ESN for later transmittal to the central host. For example, a single mobile unit 16 on a truck travelling across the country may send numerous "present" messages to the platform as the truck passes through different cellular systems. The platform 24 maintains a timestamped chronological list of the "present" messages, so the truck company dispatch can access the list and determine the location and status of the truck.

The platform 24 of FIG. 4 eventually sends this information to the particular central host associated with the mobile unit 16 as shown at block 116. This transfer of data can occur periodically, such as at a particular time interval, upon request by a central host, or whenever a call connection is made between a central host and the mobile unit 16. It should be understood that there will typically be a plurality of mobile units associated with a particular central host. For example, the central host may be a truck company dispatch that locates and coordinates the activities of a fleet of trucks equipped with mobile units 16. Thus, data can be down loaded from the platform 24 to the truck company dispatch anytime a call is made between the dispatch and any of the trucks. Alternatively, the truck company can periodically call the platform, preferably when call rates are low or on a dedicated or "800" number, and download a data package containing status and location information on the truck fleet. From the "present" message, the central host can determine at least which cellular system a particular mobile unit has entered. This information is available since the MTSO 20 appends information to the MIN/ESN. Such information may be, for example, a mobile serving carrier I.D. ("MSCID"). Furthermore, any data, including specific location data generated by positioning system 72, embedded in the ESN/MIN can be extracted by the central host.

The ability to generate "present" messages provides a significant advantage of the present invention. In particular, one central location—the platform 24—maintains these "present" messages and thus has knowledge of the location (at least the cellular system location) of various mobile units. This information allows for efficient and inexpensive call delivery. By directing calls to the mobile units through the platform 24, roaming difficulties are eliminated, since the platform 24 maintains a record of the locations of the mobile units 16. This call delivery advantage is useful in a wide range of applications, such as the broadcasting of messages to distributed mobile units, like those used in trucking companies, barges, travelling sales forces, rail systems, commercial and private bus lines, airplanes, and rental vehicles, among others. The architecture of the present invention also allows for efficient broadcasting of messages to non-mobile units, such as those used in a distributed advertising system. For example, billboards for lotteries can be programmed to automatically display the jackpot amount. This amount can be sent across cellular networks, with the calls being made through platform 24.

Figure 6:
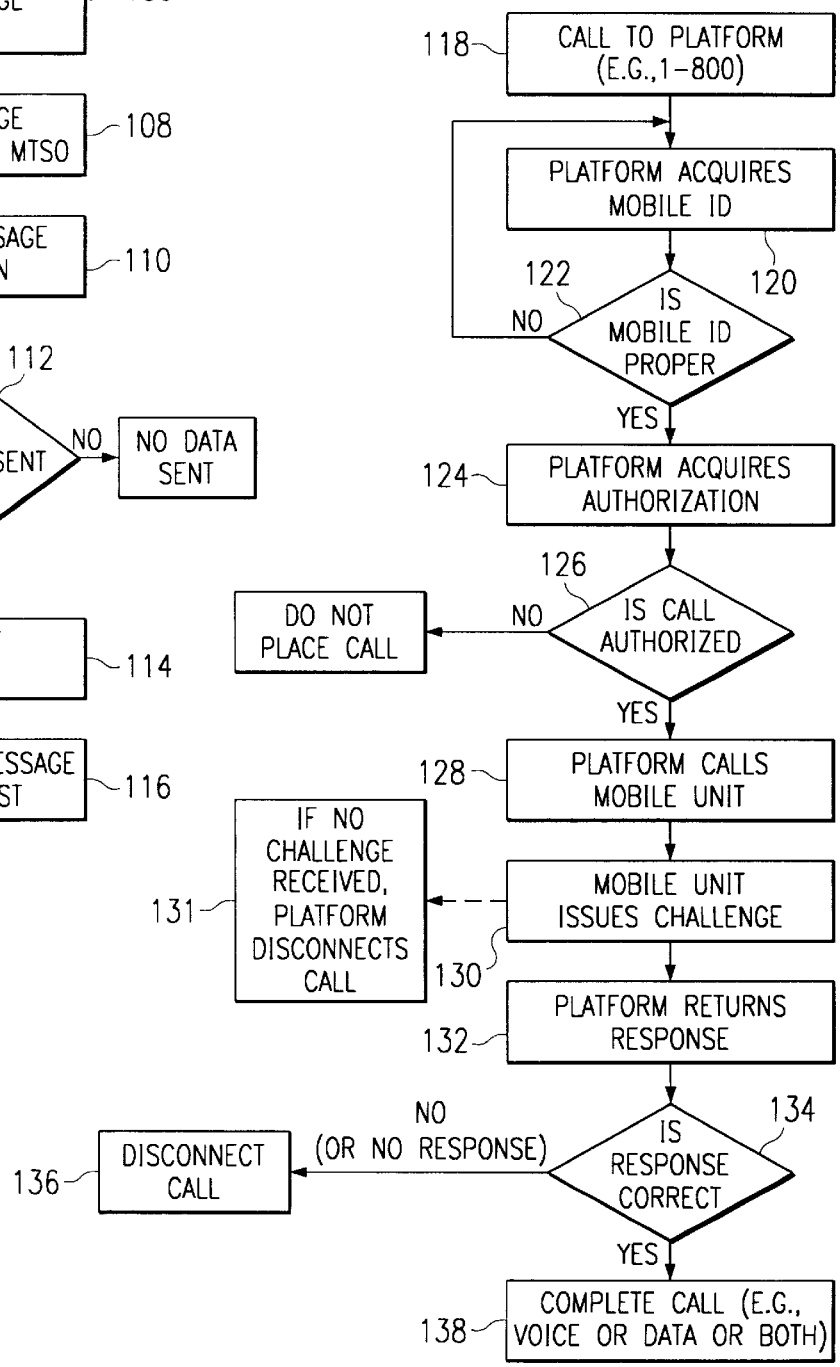
FIG. 6 is a flow diagram of a call to a mobile unit according to the teachings of the present invention.

FIG. 6 is a flow diagram of a call made to a mobile unit according to the teachings of the present invention. FIG. 6, along with FIG. 7 to be discussed below, describe the operation of the fraud management system 87 and the protocol handshake mentioned above. Without a successful handshake, a call cannot be connected either to or from a remote unit.

As shown in FIG. 6, a call to a mobile unit is first made by placing a call to the platform at block 118. This call is, for example, a 1-800 call, thereby reducing costs to those calling the platform. At block 120 the platform requests a mobile unit I.D. for the mobile unit to be called. This mobile unit I.D., for example, could be a truck identification number for mobile units placed on trucks. If no mobile unit I.D. number is received or the mobile unit I.D. is not proper, then decision block 122 returns the flow to block 120. If the mobile unit I.D. is proper, then the platform acquires authorization information at block 124. Authorization information may be, for example, a credit card number or an authorized code. For example, personal calls made to the mobile unit would only be initiated if the caller to the platform gave a valid credit card number. Validation of the credit card number may be accomplished through credit card validation system 103 of FIG. 4. For business calls coming from an associated central host, authorization can occur by entering an authorized code, or by calling in on a special business line, for example. This authorization occurs at block 126.

If the call is authorized, then the platform calls a mobile unit at block 128. Platform 24 uses look-up tables 84 of FIG. 4 to associate the phone number of the remote unit to be called with the mobile unit I.D. Platform 24 then looks up the most recently recorded cellular system identification number and switch identification number associated with mobile unit 16, such as that provided by the most recent "present" message issued by mobile unit 16 and stored by platform 24. Platform 24 then calls the appropriate roamer access port, and dials the phone number. Once the call is connected and the platform and mobile unit modems establish data communication, the mobile unit 16 issues a challenge at block 130. This challenge may be, for example, a random number. If no challenge is received, then the platform 24 disconnects the call at block 131. If the platform receives a challenge, then at block 132 the platform returns a response based on the challenge received, a key particular to the mobile unit, and an encryption algorithm. As noted, the key used in the generation of the response is a function of the mobile unit and may be generated from a lookup table of numbers shared by both mobile unit 16 and platform 24 indexed by the MIN/ESN of mobile unit 16. The encryption algorithm, also known by both mobile unit 16 and platform 24 can be any appropriate mathematical algorithm, and may be modified periodically, as can the lookup table, to maximize security.

At block 134, the platform determines whether the response is correct by running the same encryption algorithm on the challenge and key. If the response is not correct, or if no response is received, then the call is disconnected at block 136. U.S. Pat. No. 5,155,689, issued on Oct. 13, 1992, and assigned to By-Word Technologies, Inc., of Dallas Tex., discloses a system that connects or disconnects calls based upon interrogation between two modems in a cellular system. That patent is herein incorporated by reference.

If the response is correct, the call is completed at block 138. At block 138, either voice or data or both may be transmitted to or from the mobile unit.

For calls from the central host 26 that include voice communications, a voice request is sent to the platform 24 from the central host 26 to communicate with a particular mobile unit 16. Any data to be exchanged with that mobile unit is exchanged before connecting the voice communications. For example, data from the central host 26 is delivered through the platform 24 to the mobile unit 16, and any data at mobile unit 16 is delivered at least to platform 24. Next, the platform 24 requests that mobile unit 16 to switch to voice, and rings the user of mobile unit 16. If no answer is received, then no voice connection is made between mobile unit 16 and central host 26. If an answer is received, then platform 24 calls the central host 26 (or any other number provided to the platform 24 by the central host) and patches the appropriate connection.

There will be times when calls cannot be delivered to mobile unit 16, for example, when it is out of any cellular system, temporarily out of communication with a cellular system, or powered-down. In such cases, an alert will be set at the platform 24, indicating that a call has not been completed. Upon receipt of a "present" message, for example, when the mobile unit 16 to which the call was intended powers up, re-establishes communication, or enters a new cellular system, the platform 24 can complete the call. If only data is to be transferred, then this data can be sent from the platform 24 to the mobile unit 16. If a voice call had not been completed, then the platform 24 calls the calling party, for example the dispatcher at a central host, and indicates that a call can be or will automatically be placed to the appropriate mobile unit 16. Furthermore, the user of a mobile unit 16 may be provided with a pager/remote ringer, to ensure that he is aware of any voice calls to his mobile unit 16.

Figure 7:
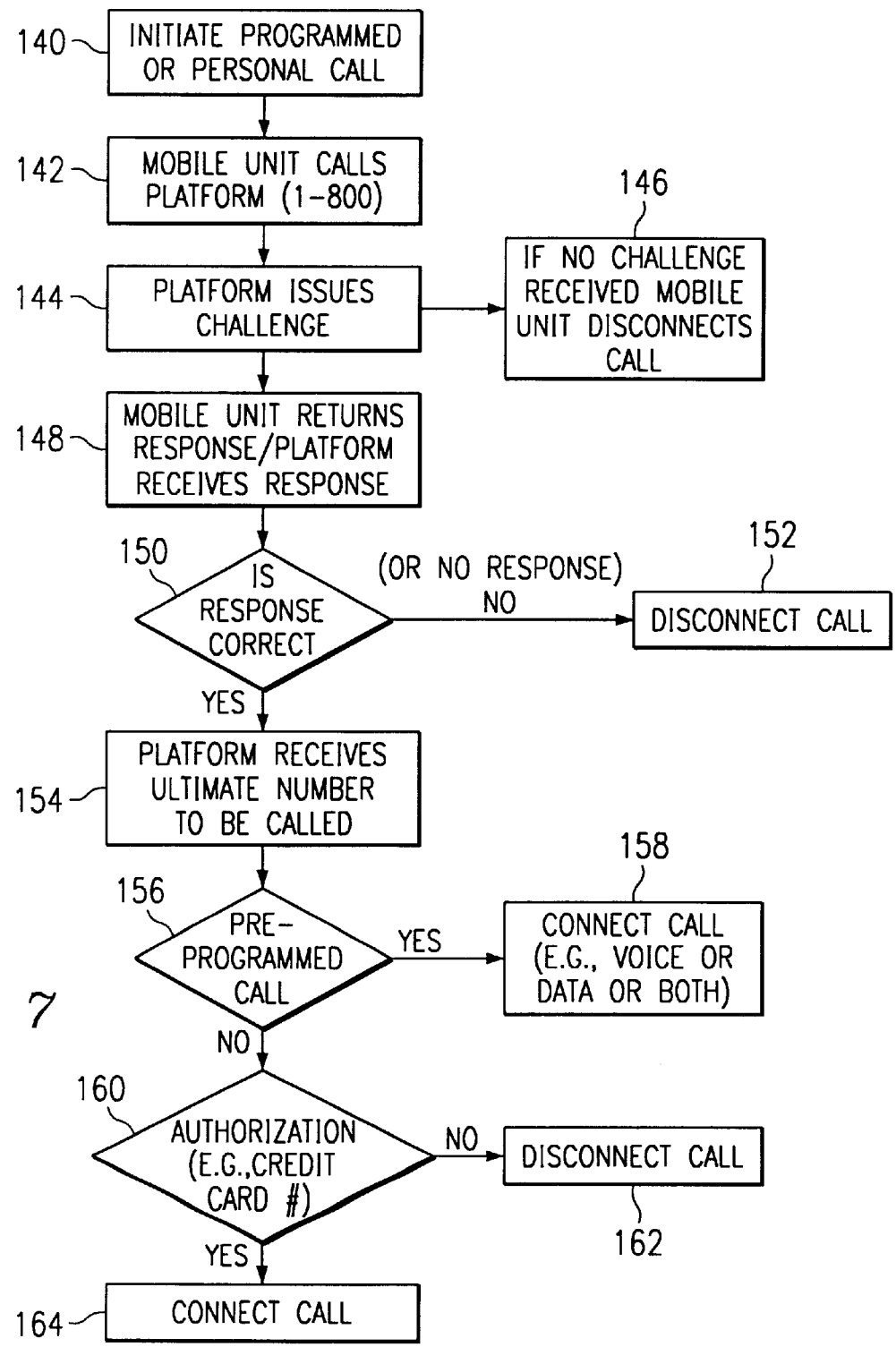
FIG. 7 is a flow diagram of a call from a mobile unit according to the teachings of the present invention.

FIG. 7 is a flow diagram of a call from a mobile unit 16 according to the teachings of the present invention. At block 140, the mobile unit will initiate an outgoing call. The outgoing call can be initiated in any of several ways. The mobile unit 16 can be programmed such that only certain pre-programmed numbers can be called. These authorized phone numbers are stored in remote unit 16 and can be programmed remotely by the central host 26 or platform 24. Thus, a user of a remote unit would only be able to call these pre-programmed numbers and no others. Alternatively, the remote unit could be configured so as to allow personal calls—if eventually authorized—as well as pre-programmed authorized calls. Regardless of what number is to be eventually called, the mobile unit 16 is pre-programmed to first call the platform at block 142. This call, for example, could be a 1-800 number call. Alternatively, arrangements can be made with each cellular system to direct all calls from mobile units with particular MIN/ESNs to platform 24. Each local carrier would recognize these particular MIN/ESNs and route their calls to platform 24. Recognition can occur through use of a pre-arranged database, as discussed above. The handshake protocol between the mobile unit and the platform is similar to that described in connection with FIG. 6, except that the challenge and response are issued by the platform and mobile unit, respectively.

As shown in FIG. 7, at block 144 the platform issues a challenge after modem connection with the mobile unit and receipt of a mobile unit I.D., such as an MIN. This I.D. provides the platform 24 with knowledge of which mobile unit is calling. If no challenge is received, then the mobile unit disconnects the call at block 146. If the challenge is received, then the mobile unit returns a response and the platform receives the response at block 148. The response is generated by executing the encryption algorithm on the challenge and the key particular to the mobile unit. If the response generated by the mobile unit does not match the desired response generated by the platform, as determined at block 150, then the call is disconnected by the platform at block 152. If the response is correct, then the platform receives the ultimate number to be called at block 154. If it is determined that this ultimate number to be called is one of the pre-programmed calls at block 156, then the call is connected at block 158. Typically, such a call would be to a user of the central host or a customer. In such a case, voice or data or both can be transmitted. If it is determined at block 156 that the ultimate number to be called is not a pre-programmed number, then an authorization decision is made at block 160. For example, block 160 may comprise a credit card authorization step. If there is no authorization for the call, then the call is disconnected at block 162. If the call is authorized at block 160, for example by entry of a valid credit card number, then the call will be connected at block 164. for data transmissions, the data can be stored at platform 24 and transmitted to central host 26 at various times, as discussed above in connection with "present" messages.

The system of the present invention provides for several layers of fraud prevention. For calls originating at mobile unit 16, a first layer of protection is the ability to restrict outgoing calls to only pre-programmed calls. Thus, a user of mobile unit 16 may be restricted from calling any unauthorized numbers.

A second layer of fraud prevention is provided by the requirement that all calls to or from a mobile unit 16 pass through the platform 24. This requirement allows for a myriad of "gatekeeping" functions to be performed at the platform 24. For example, the platform 24 may connect only certain authorized calls from the mobile unit 16, and require a valid credit card for all other calls. Likewise, the platform 24 can insure that only authorized calls (such as business calls or credit card authorized calls) are directed to the mobile unit 16.

A third layer of protection is provided by the handshake protocol of the present invention. With this handshake protocol, fraudulent procurement of the MIN/ESN of the mobile unit 16 will be to no avail without knowledge of the handshake protocol. For example, if a call were placed directly to the mobile unit 16, through knowledge of its MIN, the call could not be completed without knowledge of the handshake protocol.

One of the most popular schemes for defrauding cellular users involves obtaining the MIN/ESN of a particular mobile unit 16, and then cloning a phone with the same MIN/ESN. Such a cloned phone can then be used in most any cellular system, with the cellular usage charges being billed to the original mobile unit 16 as roamer charges. The present invention foils this variety of fraud by requiring that any call using the particular MIN/ESN of mobile unit 16 be directed through the platform 24. As discussed above, this requirement can be accomplished by making arrangements with the local cellular carriers to trap calls having particular MIN/ESNs and route them to the platform 24, or alternatively forcing all mobile units to only call the platform. The platform 24 then requires successful protocol handshaking to connect the call.

Each mobile unit 16 may be equipped with a unique handshake protocol, and the platform 24 would maintain a data base that associated each mobile unit 16 with its unique handshake protocol. Alternatively, a library of handshake protocols can be maintained, with each mobile unit 16 assigned one of the handshake protocols from that library. The platform 24 would then keep a record of which protocol of the library is assigned to a particular mobile unit 16, and perform handshake protocols accordingly.

The handshake protocol described herein provides an excellent means of preventing cellular fraud. It should be understood, however, that the mobile unit-cellular system-telecommunications platform architecture of the present invention provides technical advantages even without the fraud prevention technique. For example, the ability to gather information on the cellular system location of the mobile units 16 allows for efficient call delivery to these mobile units.

Throughout this description of the invention, the central host 26, the platform 24, the clearinghouse 22, and the cellular system 12 have been discussed as separate elements. It should be understood that each of these components are logical components, and they may be combined without physical separation. For example, the functions of the platform 24 and the central host 26 may be accomplished at a single site. Likewise, the functions of the platform 24 or clearinghouse 22 may be performed at the local cellular system, for example, at the MTSO.

The present invention has been discussed in connection with cellular systems. It should be understood that it may also be used in connection with satellite telecommunications systems. For example, the transmission towers 18 and MTSO 20 of FIG. 1 may be replaced with, or used in conjunction with, a satellite telecommunications system. Furthermore, transmissions to and from the mobile unit 16 may be across various channels, such as separate data and voice channels, for example for packet data communications.

Figure 8:
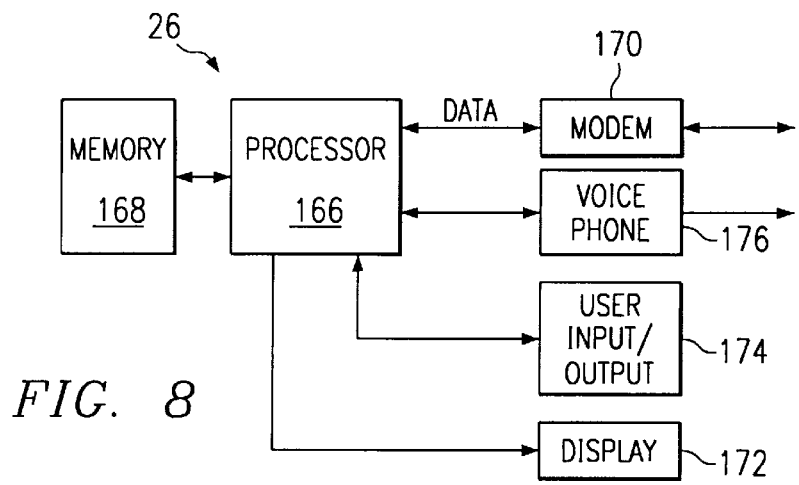
FIG. 8 is a block diagram of a central host constructed according to the teachings of the present invention.

FIG. 8 is a block diagram of the central host 26 constructed according to the teachings of the present invention. As shown in FIG. 8, a central host includes a processor 166 coupled to memory 168. Data transmitted to and received from mobile units is transmitted through modem 170 to and from processor 166. Such data may be stored in memory 168 and displayed on display 172. Furthermore, various data, such as data to be transmitted to remote units, is input through user input/output 174. Data which may be input through user input/output 174, for example, may include text data to be transmitted to a particular remote unit. Such text data could include particular messages, such as changes in delivery schedules, weather conditions, or the like. Such data is displayed on display 68 of remote unit 16, as shown in FIG. 3. Voice communications between a central host and remote units may be made through voice phone 176. Throughout this description in drawings, separate communications have been shown for data and voice, with the data passing through a modem. It should be understood that a single telecommunications line may be used to provide both voice and data without departing from the intended scope of the present invention.

In operation of central host 26 of FIG. 8, data and messages received from remote units may be displayed on display 172 and output, for example in hard copy form, through user input/output 174. For example, a map with location identification of each remote unit associated with the central host is displayed on display 172. In this way, the central host 26 can keep track of the location and progress of remote units and for example, vehicles associated with the mobile units. The processor 166 runs software which allows automated sending of data to particular remote units. This data can be automatically generated by processor 166 or input through user input/output 174. Central host can also receive raw location information, that can then be processed in processor 166 to generate latitude and longitude coordinates.

Processor 166 may also, by tracking the locations of mobile units, based on longitude and latitude and road map information, determine how many miles each mobile unit travels within a particular state. From this information, fleet mileage reports can be generated, for example for trucking companies. These fleet mileage reports can be used to determine the distance traveled and amount of fuel used in various states, which allows for accurate reporting for both fuel and road usage taxes. Furthermore, knowledge of the location of vehicles at particular times, for example from "present" messages or geographic location data, allows for calculation of estimated times of arrivals by dispatchers at central hosts. For example, knowledge that a truck is in Dallas, Tex. on Thursday night allows for an estimate of arrival time in Mobile, Ala.

Although the present invention has been described in detail, it should be understood that various substitutions or alterations can be made without departing from the spirit and scope of the invention as defined by the appended claims.

What is claimed is:

1. Apparatus for communicating present messages using cellular telephone systems, comprising:
   a plurality of mobile units, each mobile unit associated with a mobile identification number and operable to initiate communication of a present message by issuing a cellular system feature request without user intervention, wherein the cellular telephone systems deliver communications to the mobile unit using the same mobile identification number; and
   a telecommunications platform coupled to a plurality of cellular telephone systems and operable to receive the present messages, the telecommunications platform operable to store the present messages in a plurality of chronological lists associated with the mobile units, each chronological list comprising a plurality of present messages received from an associated mobile unit, wherein the plurality of present messages includes present messages identifying at least two cellular telephone systems.

2. The apparatus of claim 1, and further comprising a host operable to receive at least part of the chronological lists.

3. The apparatus of claim 1, wherein each mobile unit initiates sending of the present message when the mobile unit enters the new cellular telephone system.

4. The apparatus of claim 1, wherein the cellular system feature request corresponds to a request to clear roaming status.

5. The apparatus of claim 1, wherein each of the cellular telephone systems appends a cellular system identification number to the present messages.

6. The apparatus of claim 1, wherein each of the present messages includes a mobile identification number.

7. The apparatus of claim 1, wherein each of the present messages includes vehicle status information.

8. The apparatus of claim 1, wherein each of the present messages includes location information.

9. The apparatus of claim 8, wherein the location information is derived from a GPS positioning system.

10. The apparatus of claim 2, wherein the host is operable to determine the route of each mobile unit in response to at least part of its associated chronological list.

11. A system for communicating a present message from a mobile unit to a telecommunications platform using a plurality of cellular telephone systems, comprising:
   a mobile unit associated with a mobile identification number and operable to initiate communication of a present message by issuing a cellular system feature request without user intervention, wherein the cellular telephone systems deliver communications to the mobile unit using the same mobile identification number;
   a clearinghouse coupled to the mobile unit, the clearinghouse operable to receive the present message from the mobile unit, the clearinghouse further operable to selectively communicate the present message if at least a portion of the mobile identification number of the mobile unit matches a number stored in a user database at the clearinghouse; and a telecommunications platform coupled to a plurality of cellular telephone systems and the clearinghouse and operable to receive the present message communicated by the clearinghouse, the telecommunications platform further operable to store the present message in a chronological list of present messages generated by the mobile unit and received at the telecommunications platform, wherein the chronological list includes present messages identifying at least two cellular telephone systems.

12. The system of claim 11, wherein the clearinghouse is a mobile telecommunications switching office of a cellular telephone system serving the mobile unit.

13. The system of claim 12, wherein the mobile telecommunications switching office appends a cellular system identification number to the present message.

14. The system of claim 11, further comprising a mobile telecommunications switching office coupled to the mobile unit and the clearinghouse, the mobile telecommunications switching office operable to receive the present message from the mobile unit and to communicate the present message to the clearinghouse.

15. The system of claim 14, wherein the mobile telecommunications switching office appends a cellular system identification number to the present message.

16. The system of claim 11, wherein the clearinghouse compares the mobile identification number to an area code and a prefix stored in a memory to determine whether to communicate the present message to the telecommunications platform.

17. The system of claim 11, wherein the cellular system feature request corresponds to a request to clear roaming status.

18. A method for communicating a present message from a mobile unit to a telecommunications platform coupled to a plurality of cellular telephone systems, comprising:

generating the present message at the mobile unit, wherein the present message includes a mobile identification number of the mobile unit;

communicating the present message to a clearinghouse by issuing a cellular system feature request without user intervention;

delivering communications from the cellular telephone systems to the mobile unit using the mobile identification number;

reading, at the clearinghouse, the mobile identification number included in the present message;

selectively communicating the present message to the telecommunications platform if at least a portion of the mobile identification number of the mobile unit matches a number stored in a user database at the clearinghouse; and storing the present message in a chronological list of present messages generated by the mobile unit and received at the telecommunications platform, wherein the chronological list includes present messages identifying at least two cellular telephone systems.

19. The method of claim 18, wherein the clearinghouse is a mobile telecommunications switching office of the new cellular telephone system serving the mobile unit.

20. The system of claim 19, comprising the step of appending the cellular system identification number to the present message at the mobile telecommunications switching office.

21. The method of claim 18, wherein the stop of communicating the present message to a clearinghouse comprises:

communicating the present message from the mobil unit to a mobile telecommunications switching office; and communicating the present message from the mobile telecommunications switching office to the clearinghouse.

22. The method of claim 21, comprising the step of appending the cellular system identification number to the present message at the mobile telecommunications switching office.

23. The method of claim 18, comprising the step of comparing the mobile identification number to an area code and a prefix stored in a memory at the clearinghouse.

24. The method of claim 18, wherein the cellular system feature request corresponds to a request to clear roaming status.

25. A system for determining the route of a mobile unit equipped with a cellular telephone, comprising:

the mobile unit associated with a mobile identification number and operable to initiate communication of a plurality of present messages by issuing a plurality of cellular system feature requests without user intervention, wherein a plurality of cellular telephone systems deliver communications to the mobile unit using the same mobile identification number;

a telecommunications platform coupled to the cellular telephone systems, the telecommunications platform operable to receive the present messages communicated by the mobile unit, the telecommunications platform further operable to accumulate the present messages into a chronological list, wherein the chronological list includes present messages identifying at least two cellular telephone systems; and a host coupled to the telecommunications platform, the host operable to receive at least a portion of the chronological list from the telecommunications platform, the host further operable to determine the route of the mobile unit over time in response to at least a portion of the chronological list.

26. The system of claim 25, wherein the present messages received by the telecommunications platform include information on the new cellular telephone system providing service to the mobile unit.

27. The system of claim 25, comprising a positioning system on the mobile unit operable to generate location information, wherein the present messages include location information generated by the positioning system.

28. The system of claim 25, wherein the cellular system feature requests correspond to requests to clear roaming status.

29. The system of claim 25, comprising a plurality of mobile telecommunications switching offices within the plurality of cellular telephone systems, the mobile telecommunications switching offices operable to receive the present messages from the mobile unit and to communicate the present messages to the telecommunications platform.

30. The system of claim 29, wherein the mobile telecommunications switching offices append cellular system information to the present messages received from the mobile unit.

31. The system of claim 25, comprising:

a plurality of mobile telecommunications switching offices within the plurality of cellular telephone systems, the mobile telecommunications switching offices operable to receive the present messages from the mobile unit, the mobile telecommunications switching offices further operable to append cellular system information to the present messages received from the mobile unit; and a clearinghouse coupled to the plurality of cellular telephone systems and operable to receive the present messages from the mobile telecommunications switching offices, the clearinghouse further operable to communicate the present messages to the telecommunications platform.

32. The system of claim 31, wherein the clearinghouse selectively communicates the present messages to the telecommunications platform in response to the content of the present messages.

33. A method for determining the route of a mobile unit equipped with a cellular telephone, comprising:

generating a plurality of present messages at the mobile unit, wherein the mobile unit is associated with a mobile identification number;

communicating the present messages to a telecommunications platform coupled to a plurality of cellular telephone systems by issuing a plurality of cellular system feature requests without user intervention;

delivering communications from the cellular telephone systems to the mobile unit using the mobile identification number;

accumulating the present messages into a chronological list, wherein the chronological list includes present messages identifying at least two cellular telephone systems;

communicating at least a portion of the chronological list to a host; and determining the route of the mobile unit at the host in response to at least a portion of the chronological list.

34. The method of claim 33, comprising the step of appending cellular telephone system information to the present messages.

35. The method of claim 33, comprising the steps of:

generating location information at the mobile unit using a positioning system; and including the location information in the present messages generated at the mobile unit.

36. The method of claim 33, wherein the cellular system feature requests correspond to requests to clear roaming status.

37. The method of claim 33, wherein the step of communicating the present messages to the telecommunications platform comprises:

communicating the present messages from the mobile unit to a plurality of mobile telecommunications switching offices; and communicating the present messages from the mobile telecommunications switching offices to the telecommunications platform.

38. The method of claim 37, comprising the step of appending cellular system information to the present messages before communicating the present messages from the mobile telecommunications switching offices to the telecommunications platform.

39. The method of claim 33, wherein the step of communicating the present messages to the telecommunications platform comprises:

communicating the present messages from the mobile unit to a plurality of mobile telecommunications switching offices;

communicating the present messages from the mobile telecommunications switching offices to a clearinghouse; a communicating the present messages from the clearinghouse to the telecommunications platform.

40. The method of claim 39, comprising the step of appending cellular system information to the present messages before communicating the present messages from the mobile telecommunications switching offices to the clearinghouse.

41. The method of claim 39, wherein the clearinghouse selectively communicates the present messages to the telecommunications platform in response to the content of the present messages.

42. The system of claim 25, wherein the host comprises a display operable to display the location of the mobile unit in response to at least a portion of the chronological list.

43. The method of claim 33, wherein the step of tracking the location of the mobile unit comprises displaying the location of the mobil unit at the host in response to at least a portion of the chronological list.

44. A telecommunications platform coupled to a cellular telephone network having a plurality of cellular telephone systems, comprising:

a telecommunications trunk coupled to the cellular telephone network, the telecommunications trunk operable to receive a plurality of present messages communicated by a mobile unit using a cellular system feature request without user intervention, wherein the mobile unit is associated with a mobile identification number and the cellular telephone systems deliver communications to the mobile unit using the same mobile identification number; and a memory coupled to the telecommunications trunk, the memory operable to store the received present messages in a chronological list associated with the mobile unit, wherein the chronological list includes present messages identifying at least two cellular telephone systems in the cellular telephone network.

45. The telecommunications platform of claim 44, comprising a second telecommunications trunk coupled to the memory, the second telecommunications trunk operable to communicate at least a portion of the chronological list to a host.

46. The telecommunications platform of claim 44, wherein each of the present messages includes vehicle status information.

47. The telecommunications platform of claim 44, wherein each of the present messages includes location information.

48. The telecommunications platform of claim 44, wherein the memory stores the chronological list indexed by the mobile identification number of the mobile unit.

49. The telecommunications platform of claim 44, wherein the telecommunications trunk is operable to link the telecommunications platform to a clearinghouse.

50. The telecommunications platform of claim 44, wherein the telecommunications trunk is operable to link the telecommunications platform to a mobile telecommunications switching office.

51. The telecommunications platform of claim 44, comprising a display coupled to the memory, the display operable to display the location of the mobile unit in response to at least a portion of the chronological list.

52. A method for accumulating a plurality of present messages communicated from a mobile unit using a cellular telephone network having a plurality of cellular telephone systems, the method comprising:

receiving, at a telecommunications trunk coupled to the cellular telephone network, the present messages communicated by the mobile unit using a cellular system feature request without user intervention, wherein the mobile unit is associated with a mobile identification number and the cellular telephone systems deliver communications to the mobile unit using the same mobile identification number; and storing the present messages in a chronological list of present messages generated by the mobile unit and received at the telecommunications platform, wherein the chronological list includes present messages identifying at least two cellular telephone systems in the cellular telephone network.

53. The method of claim 52, comprising the step of communicating at least a portion of the chronological list to a host.

54. The method of claim 52, comprising the steps of:
receiving a request from a host for at least a portion of the chronological list; and
communicating at least a portion of the chronological list to the host in response to the request.

55. The method of claim 52, wherein each of the present messages includes vehicle status information.

56. The method of claim 52, wherein each of the present messages includes location information.

57. The method of claim 52, wherein the step of storing the present sages comprises:
reading a mobile identification number of the mobile unit included in the present messages; and
storing the present messages in a chronological list associated with the mobile identification number of the mobile unit.

58. The method of claim 52, wherein the step of receiving the present messages comprises receiving the present messages from a clearinghouse.

59. The method of claim 52, wherein the step of receiving the present messages comprises receiving the present messages from a plurality of mobile telecommunications switching offices.

60. An apparatus for communicating a present message using a plurality of cellular telephone systems, comprising:
a mobile unit associated with a mobile identification number and operable to initiate communication of a present message without user intervention, wherein the cellular telephone systems deliver communications to the mobile unit using the same mobile identification number; and
a telecommunications platform operable to receive the present message, the telecommunications platform further operable to store the present message indexed by the mobile identification number.

61. The apparatus of claim 60, wherein the mobile unit initiates communication of the present message by issuing a cellular system feature request.

62. The apparatus of claim 60, wherein the telecommunications platform is further operable to store the present message in a chronological list associated with the mobile unit, the chronological list comprising a plurality of present messages received from the mobile unit.

63. The apparatus of claim 62, wherein the telecommunications platform is coupled to a plurality of cellular telephone systems, and the plurality of present messages includes present messages identifying at least two cellular telephone systems.

64. A method for communication using cellular telephone systems, comprising:
operating a mobile unit in a first cellular telephone system using a mobile identification number;
entering a second cellular telephone system;
initiating communication of a present message from the mobile unit to the telecommunications platform without user intervention; and
delivering communications to the mobile unit using the same mobile identification number upon entering the second cellular telephone system.

65. The method of claim 64, further comprising communicating the present message by issuing a cellular system feature request.

66. The method of claim 64, further comprising:
communicating the present message to a clearinghouse;
reading, at the clearinghouse, the mobile identification number included in the present message; and
selectively communicating the present message to the telecommunications platform if at least a portion of the mobile identification number of the mobile unit matches a number stored in a user database at the clearinghouse.

67. The method of claim 64, further comprising receiving and storing in a chronological list at the telecommunications platform the present message indexed by the mobile identification number of the mobile unit.

68. The method of claim 64, wherein the telecommunications platform is coupled to a plurality of cellular telephone systems, the method further comprising storing the present message in a chronological list of present messages generated by the mobile unit and received at the telecommunications platform, wherein the chronological list includes present messages identifying at least two cellular telephone systems.

69. An apparatus for communicating present messages using cellular telephone systems, comprising a mobile unit associated with a mobile identification number and operable to initiate communication of a present message upon entering cellular telephone systems without user intervention, wherein the cellular telephone systems deliver communications to the mobile unit using the same mobile identification number.

70. The apparatus of claim 69, further comprising a telecommunications platform coupled to a plurality of cellular telephone systems and operable to receive the present message, the telecommunications platform further operable to store the present message indexed by the mobile identification number.

71. The apparatus of claim 69, wherein the mobile unit initiates communication of the present message by issuing a cellular system feature request.

72. The apparatus of claim 70, wherein the telecommunications platform is further operable to store the present message in a chronological list associated with the mobile unit, the chronological list comprising a plurality of present messages received from the mobile unit.

73. The apparatus of claim 72, wherein the chronological list includes present messages identifying at least two cellular telephone systems.

* * * * *